(12) United States Patent  
Seo et al.

(10) Patent No.: US 7,385,782 B2
(45) Date of Patent: Jun. 10, 2008

(54) CASSETTE HOUSING ASSEMBLY HAVING AN X-LEVER WITH A LOCKING MEMBER CONNECTED THERETO AND A MAGNETIC RECORDING AND REPRODUCING APPARATUS HAVING THE SAME

(75) Inventors: Jae-kab Seo, Suwon-si (KR);
Jun-young Kim, Suwon-si (KR);
Jeong-hyeob Oh, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 469 days.

(21) Appl. No.: 11/109,670

(22) Filed: Apr. 20, 2005

(65) Prior Publication Data

US 2006/0092552 A1    May 4, 2006

(30) Foreign Application Priority Data

Nov. 4, 2004    (KR) ...................... 10-2004-0089119

(51) Int. Cl.
*G11B 15/675* (2006.01)
(52) U.S. Cl. ................................... 360/96.51
(58) Field of Classification Search ............... 360/96.5, 360/96.51
See application file for complete search history.

(56) References Cited

U.S. PATENT DOCUMENTS 6,198,596 B1 * 3/2001 Kumagai et al. .......... 360/96.5
6,624,965 B1 * 9/2003 Kumagai et al. .......... 360/96.5
6,754,039 B2 * 6/2004 Kumagai ................ 360/96.5
2005/0280931 A1 * 12/2005 Seo et al. ................ 360/96.5

FOREIGN PATENT DOCUMENTS

| JP | 64-085937 | 3/1989 |
| JP | 03-084941 | 4/1991 |
| JP | 06-076436 | 3/1994 |
| JP | 10-021609 | 1/1998 |
| KR | 86-8731 | 12/1984 |
| KR | 20-0147771 | 10/1995 |
| KR | 97-25340 | 11/1995 |

* cited by examiner

*Primary Examiner*—Jefferson Evans
(74) *Attorney, Agent, or Firm*—Roylance, Abrams, Berdo & Goodman, L.L.P.

(57) ABSTRACT

A cassette housing assembly for a magnetic recording and reproducing apparatus includes a cassette housing adapted to receive a cassette tape and having a locking lever. An X-lever supports vertical movement of the cassette housing with respect to a deck chassis. A locking member fixes the locking lever to retain the cassette housing is in a down position. The locking member is made of substantially the same material as the X-lever, such that abrasion of the locking member and the locking lever is substantially prevented. The locking member may be integrally formed with the X-lever, such as a drawing boss or a burring boss.

20 Claims, 4 Drawing Sheets

CASSETTE HOUSING ASSEMBLY HAVING AN X-LEVER WITH A LOCKING MEMBER CONNECTED THERETO AND A MAGNETIC RECORDING AND REPRODUCING APPARATUS HAVING THE SAME

CROSS-REFERENCE TO RELATED APPLICATIONS

This application claims the benefit of Korean Patent Application No. 2004-89119, filed Nov. 4, 2004, in the Korean Intellectual Property Office, the entire disclosure of which is hereby incorporated by reference.

BACKGROUND OF THE INVENTION

1. Field of the Invention

The present invention relates to a magnetic recording and reproducing apparatus. More particularly, the present invention relates to an improved cassette housing assembly and a magnetic recording and reproducing apparatus having the same.

2. Description of the Related Art

Magnetic recording and reproducing apparatuses, such as video cassette recorders (VCR) and digital versatile camcorders (DVC), use a magnetic tape as a recording medium, and include a deck for withdrawing and running the tape from a cassette tape to record or reproduce certain information, a photographing unit having a viewfinder, and a signal processing unit.

The deck includes a deck chassis that includes a reel table for rotating a tape reel of the cassette tape, a loading motor, a capstan motor, a plurality of guide rollers constituting a tape running system and a head drum, and a cassette housing assembly mounted to move vertically with respect to the deck chassis to mount the cassette tape. A locking unit fixes the cassette housing assembly in a down position.

FIGS. 1 and 2 are schematic views of the structure of the cassette housing assembly employed in a conventional magnetic recording and reproducing apparatus, respectively showing up and down positions of the cassette housing assembly. Reference numeral 10 denotes a cassette housing, 20 denotes an X-lever, and 30 denotes a locking unit.

The cassette housing 10 is mounted to the deck chassis (not shown) to be vertically moved by the X-lever 20. The X-lever 20 consists of a first lever 21 and a second lever 22 connected across each other. One end of each of the levers 21 and 22 is connected to a flank of the cassette housing 10, respectively, while the other end of each of the levers 21 and 22 is connected to the deck chassis (not shown).

The locking unit 30 fixes the cassette housing 10 to the deck chassis to maintain the down position of the cassette housing 10. The locking unit 30 includes a locking lever 31 having a hook 31a formed on the flank of the cassette housing 10 and a locking member 32 integrally formed with the deck chassis by partly bending the flank of the deck chassis.

In the up position of the cassette housing 10, as shown in FIG. 1, when a cassette tape (not shown) is loaded in the cassette housing 10 and the cassette housing 10 mounting the cassette tape is pressed down to the deck chassis, the cassette housing 10 descends by the operation of the X-lever 20. Therefore, the hook 31a of the locking lever 31 is caught by the locking member 32 of the deck chassis, thereby maintaining the down position of the cassette housing 10, as shown in FIG. 2. If an end 31b of the locking lever 31 is pushed in the direction indicated by the arrow in FIG. 2, the locking lever 31 is released from the locking member 32, and accordingly, the cassette housing 10 goes to the up position to remove the cassette tape, as shown in FIG. 1.

Recently, steel electrolytic commercial cold (SECC), which is inexpensive and superior in processibility, has been used to manufacture the deck chassis in consideration of low manufacturing costs. Generally, however, the locking lever 31 is made of steel use stainless (SUS) while the locking member 32 is made of SECC (as is the deck chassis).

When the locking lever 31 is made of SUS and the locking member 32 is made of SECC, the cassette housing 10 may be unstably received since the locking member 32 has a relatively lower strength and is subject to abrasion. Such an unstable mounting of the cassette housing 10 may cause malfunction of the tape running operation.

Accordingly, a need exists for a magnetic recording and reproducing apparatus having an improved cassette housing that is stably inserted in and withdrawn from the deck chassis to improve quality and reliability of the magnetic recording and reproducing apparatus.

SUMMARY OF THE INVENTION

An object of the present invention is to provide a cassette housing assembly for a magnetic recording and reproducing apparatus capable of receiving and withdrawing a cassette housing with respect to a deck chassis in a stable manner, irrespective of the material of the deck chassis.

Another object of the present invention is to provide a magnetic recording and reproducing apparatus having the cassette housing assembly as described above.

A cassette housing assembly for a magnetic recording and reproducing apparatus having a cassette housing adapted to receive a cassette tape and including a locking lever, and an X-lever for supporting vertical movement of the cassette housing with respect to a deck chassis. A locking member fixes the locking lever in a state that the cassette housing is in a down position.

The locking member is made of the same material as the X-lever to restrain abrasion of the locking lever and the locking member.

The material for the locking member is steel use stainless (SUS). For example, the locking member includes a drawing boss or a burring boss formed by performing drawing or burring with respect to the X-lever.

According to another object of the present invention, a cassette housing assembly for a magnetic recording and reproducing apparatus includes a cassette housing for mounting a cassette tape. An X-lever supports vertical movement of the cassette housing with respect to a deck chassis. A locking unit fixes the cassette housing in a down position. The locking unit includes a locking lever formed on a flank of the cassette housing and has a hook. A locking member is formed on the X-lever to engage the hook of the locking lever when the cassette housing is in the down position.

According to yet another aspect of the present invention, a magnetic recording and reproducing apparatus has a deck chassis made of steel electrolytic commercial cold (SECC) and includes a pair of reel tables for engagement with tape reels of a cassette tape, a plurality of rollers constituting a tape running system and a head drum assembly. A cassette housing mounts the cassette tape. An X-lever connects the cassette housing to the deck chassis so that the cassette housing is vertically moved to receive or separate the cassette tape and is preferably made of steel use stainless (SUS). A locking unit fixes the cassette housing in a down position for moving the cassette tape into the deck chassis. The locking unit includes a locking lever formed on a flank of the cassette housing and has a hook, and is preferably made of SUS. A locking member is integrally formed on the X-lever to be engaged with the hook of the locking lever.

The material for the locking member is preferably steel use stainless (SUS). For example, the locking member includes a drawing boss or a burring boss formed by performing drawing or burring with respect to the X-lever.

Other objects, advantages and salient features of the invention will become apparent from the following detailed description, which, taken in conjunction with the annexed drawings, discloses preferred embodiments of the invention.

BRIEF DESCRIPTION OF THE DRAWING FIGURES

The above aspect and other features of the present invention will become more apparent by describing in detail exemplary embodiments thereof with reference to the attached drawing figures, wherein.

Throughout the drawings, like reference numerals will be understood to refer to like parts, components and structures.

DETAILED DESCRIPTION OF EXEMPLARY EMBODIMENTS

Hereinafter, exemplary embodiments of the present invention will be described in detail with reference to the accompanying drawing figures.

The matters defined in the description, such as a detailed construction and elements thereof, are provided to assist in a comprehensive understanding of the present invention. Thus, it is apparent that the present invention may be carried out without those defined matters. Also, detailed descriptions of well-known functions and constructions are omitted to provide a clear and concise description.

Figure 1:
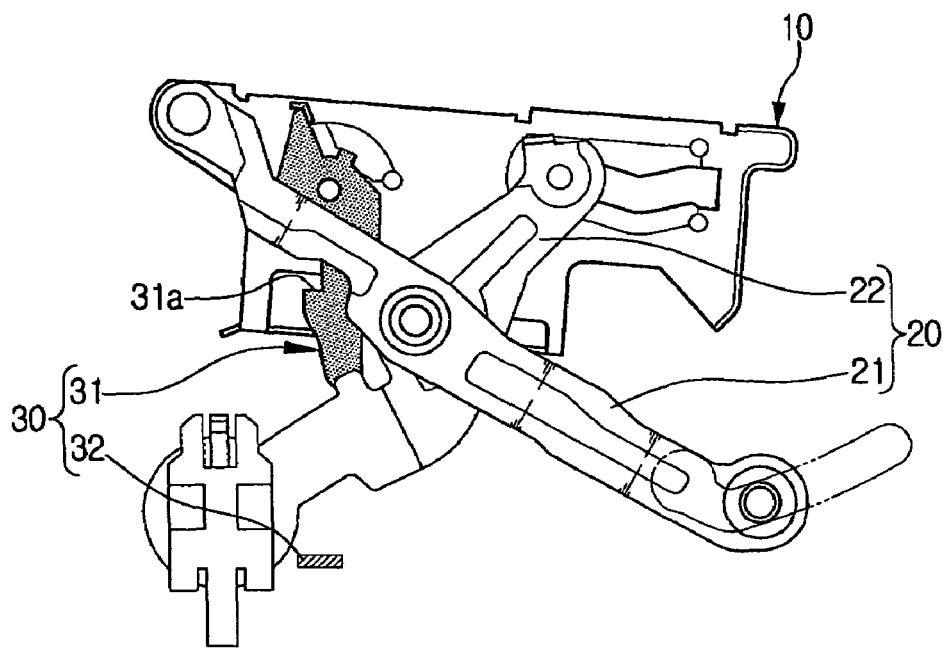
FIG. 1 is a schematic view of a general cassette housing assembly for a magnetic recording and reproducing apparatus.
Figure 2:
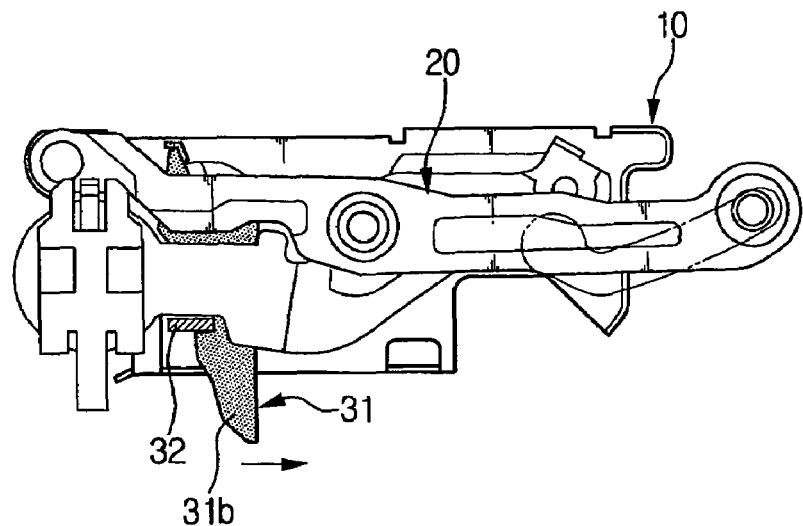
FIG. 2 is a schematic view of the cassette housing assembly of FIG. 1 as received into a deck chassis.
Figure 3:
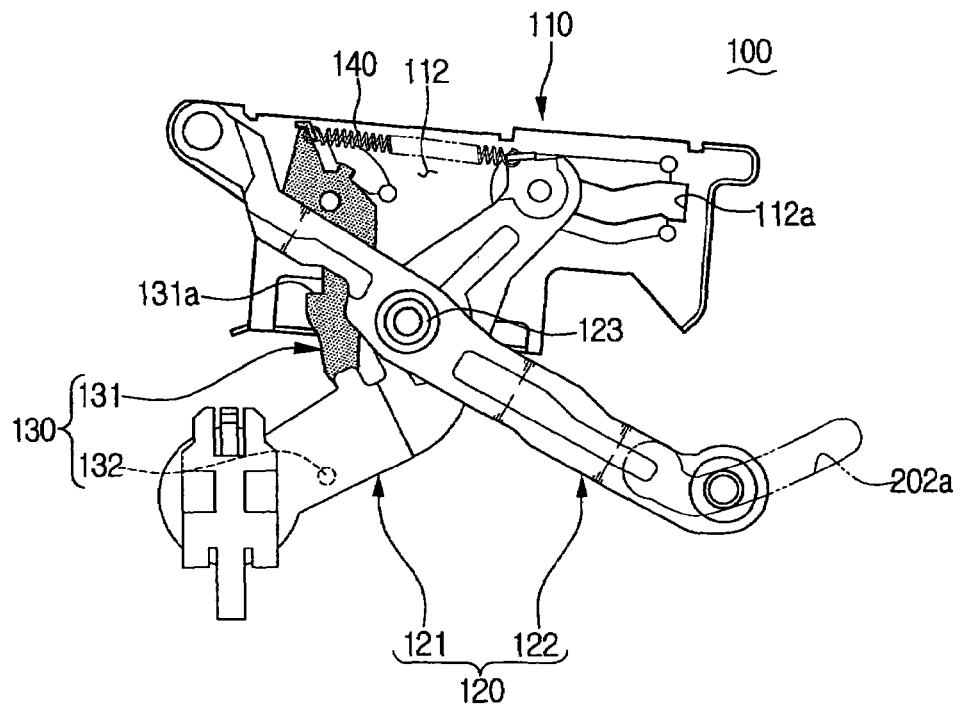
FIG. 3 is an elevational view of a cassette housing assembly for a magnetic recording and reproducing apparatus according to an exemplary embodiment of the present invention.
Figure 4:
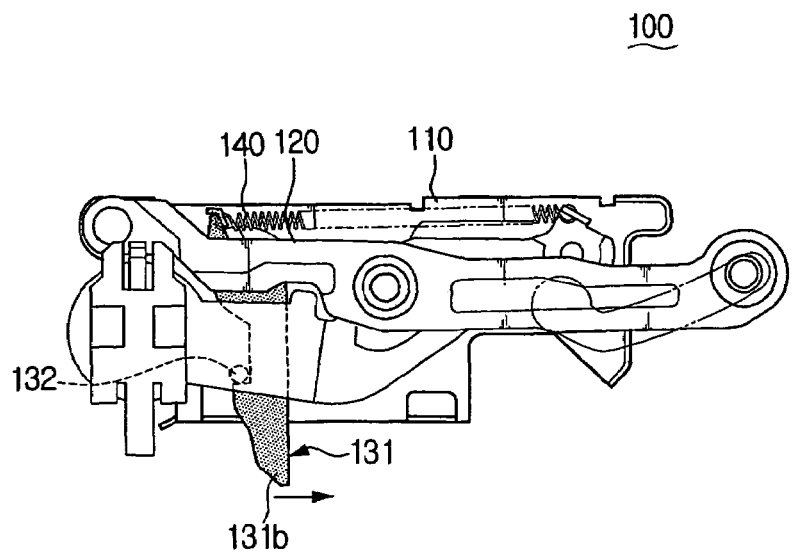
FIG. 4 is an elevational view of the cassette housing assembly of FIG. 3 as received into a deck chassis.

Referring to FIGS. 3 and 4, a cassette housing assembly 100 for a magnetic recording and reproducing apparatus, according to an exemplary embodiment of the present invention, includes a cassette housing 110 for mounting a cassette tape C (FIG. 5), an X-lever 120 for supporting vertical movement of the cassette housing 110 with respect to a deck chassis 200 (FIG. 5), and a locking unit 130 for locking the cassette housing 110 in a down position.

Figure 5:
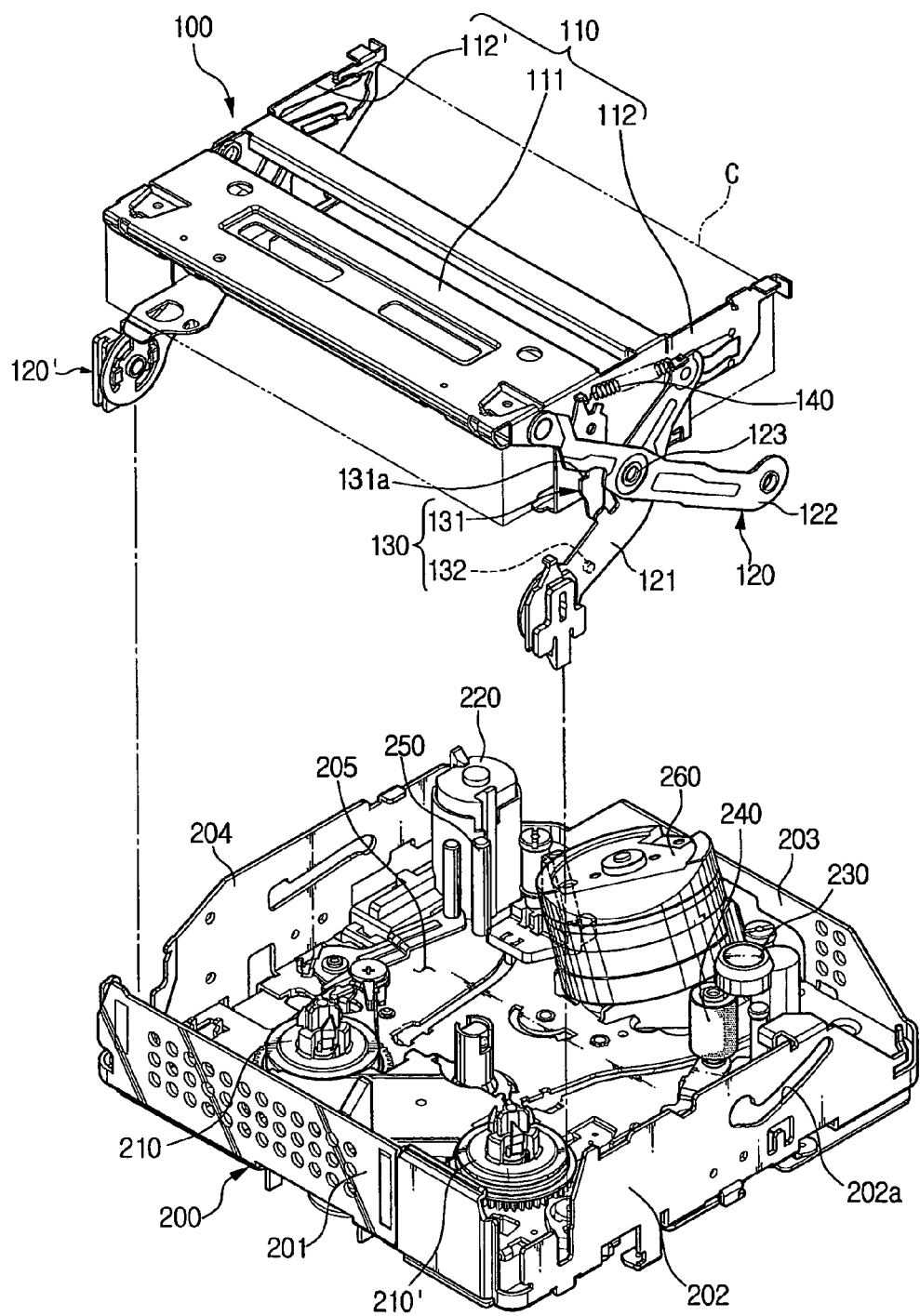
FIG. 5 is a perspective view of a deck of a magnetic recording and reproducing apparatus applying the cassette housing assembly according to an embodiment of the present invention.

The cassette housing 110 includes a plane 111 and flanks 112 and 112' substantially perpendicularly bent at opposite sides of the plane 111, as shown in FIG. 5. The cassette tape C is received and kept in the received state by the plane 111 and the flanks 112 and 112'.

The X-lever 120 has first and the second levers 121 and 122 connected by a shaft pin 123 in a crossing manner, as shown in FIG. 3. One end of each of the levers 121 and 122 is connected to the cassette housing flank 112, and the other end of each of the levers 121 and 122 is connected to a deck chassis flank 202. The cassette housing flank 112 and the deck chassis flank 202 respectively have slits 112a and 202a for operation of the X-lever.

The X-levers 120 and 120' are preferably provided in a pair, that is, an X-lever is disposed on each side of the cassette housing 110. The cassette housing 110 moves stably up and down with respect to the deck chassis 200 due to the pair of X-levers 120 and 120'.

In the up position of the cassette housing 110 (FIG. 3), the cassette housing 110 is opened by a certain distance from the deck chassis 200 to receive or remove the cassette tape C. In the down position (FIG. 4), the cassette housing 110 is received in the deck chassis 200 so that the tape reel of the cassette tape C is engaged with reel tables 210 and 210 (FIG. 5).

The X-levers 120 and 120' are generally made of steel use stainless (SUS) to prevent transformation and abrasion thereof. Even though the deck chassis 200 is made of steel electrolytic commercial cold (SECC), which has superior processibility at a low price to save manufacturing costs, the X-levers 120 and 120' are made of the SUS because transformation and abrasion thereof considerably affects the stable mounting of the cassette tape C.

Figure 6:
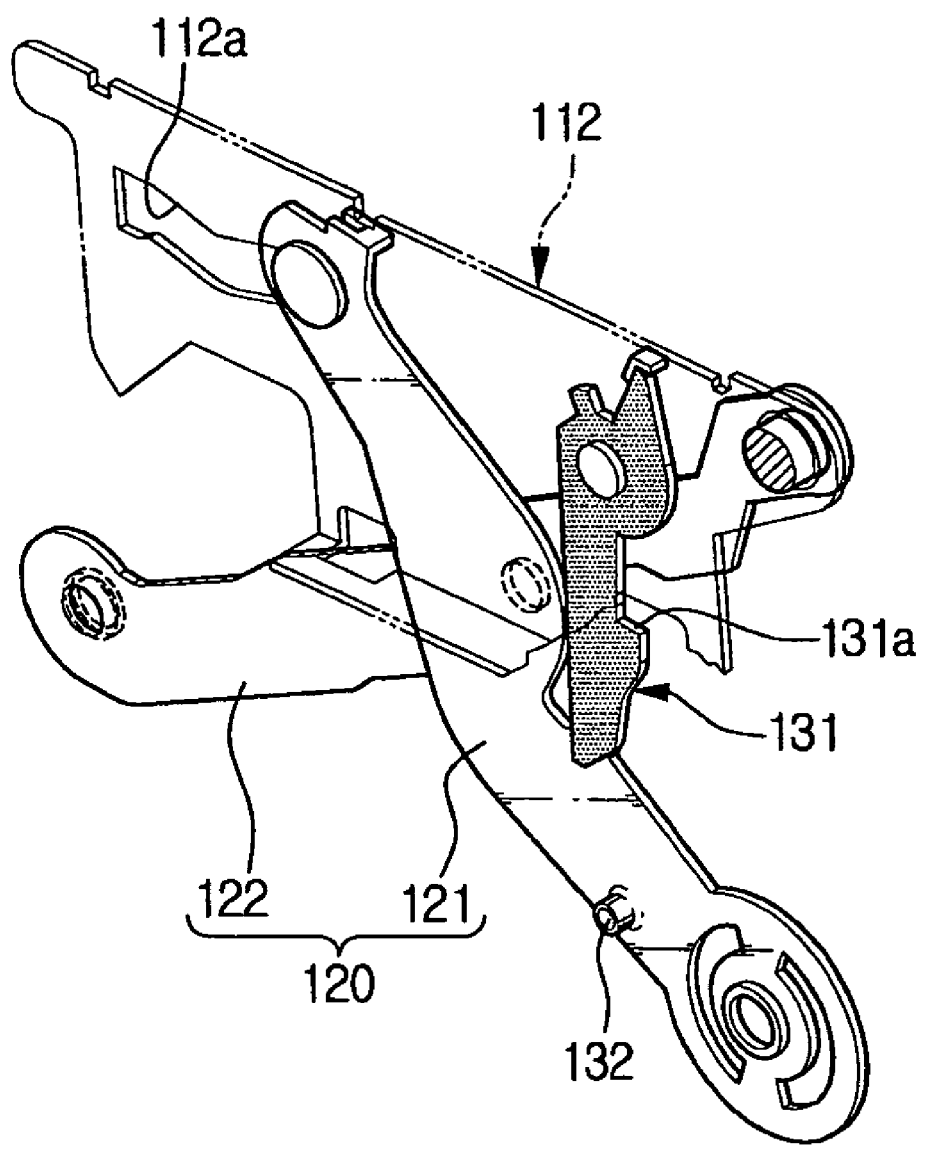
FIG. 6 is a perspective view of the X-lever of FIG. 5.

The locking unit 130 fixes the cassette housing 110 when the cassette housing 110 is received in the deck chassis 200. As shown in FIGS. 5 and 6, the locking unit 130 includes a locking lever 131 having a hook 131a disposed on the one cassette housing flank 112 of the cassette housing 110 and a locking member 132 disposed on the first lever 121 of the X-lever 120.

The locking lever 131 and the locking member 132 are preferably made of the same material in order to substantially prevent abrasion. In an exemplary embodiment, both the locking lever 131 and the locking member 132 are made of SUS so as not to be easily affected by frequent abrasive contact therebetween.

The locking member 132 is disposed on the first lever such that the hook 131a of the locking lever 131 is caught by the locking member 132 when the cassette housing 110 is in the down position. The locking member 132 may be separately formed by a pin or a boss and attached to the X-lever 120, or may be integrally formed with the X-lever 120. Integral formation is preferable for productivity and to facilitate assembly.

More specifically, the locking member 132 may include a drawing boss formed by drawing or a burring boss formed by burring with respect to the first lever 121.

FIG. 5 is a perspective view of a deck of a magnetic recording and reproducing apparatus applying the cassette housing assembly according to an exemplary embodiment of the present invention, and FIG. 6 is a perspective view of the X-lever 120 of FIG. 5.

Referring to FIGS. 5 and 6, the deck chassis 200 includes a bottom 205 and four sidewalls 201 through 204 bent at edges of the bottom 205 and substantially perpendicular to the bottom 205. The deck chassis 200 has thereon a pair of reel table 210 and 210' for insertion in the cassette tape C, a loading motor 220, a capstan motor 230, a plurality of guide rollers 240 and 250 constituting a tape running system, and a head drum 260. The deck chassis 200 is preferably made of SECC, which is inexpensive and easy to process.

As described above, the cassette housing assembly 100 is secured to the deck chassis 200 to be movable up and down by the X-levers 120 and 120'. The cassette housing assembly 100 is moved upwardly by a spring 140 to receive or remove the cassette tape C, and moved downwardly by the locking unit 130 so that the cassette tape C is received in the deck chassis 200.

When the cassette housing 110 is in the up position, as shown in FIG. 3, the cassette tape C may be inserted therein. As the cassette housing 110 is pressed downwardly, the cassette housing 110 is drawn into the deck chassis 200 by the X-lever 120. After the cassette housing 110 descends to the down position as shown in FIG. 4, the hook 131a of the locking lever 131 is caught by the locking member 132 disposed on the X-lever 120 and retained in this position. If an end 131b of the locking lever 131 is pushed in a direction indicated by the arrow of FIG. 4, the locking lever 131 is released from the locking member 132. Accordingly, the cassette housing 110 returns to the up position for removing the cassette tape therefrom, as shown in FIG. 3.

The above-described operation of locking the cassette housing substantially prevents abrasion between the locking lever 131 and the locking member 132 by forming them using substantially the same material. According to the conventional cassette housing assembly, since the locking member is integrally formed with the deck chassis that is made of SECC, the locking member is subject to abrasion due to frequent contact with the locking lever that is made of SUS. However, according to an exemplary embodiment of the present invention, the locking lever 131 and the locking member 132 are made of substantially the same material and are subject to the detrimental effects of abrasion.

According to an exemplary embodiment of the present invention described above, the cassette housing 110 may be received and withdrawn with respect to a deck chassis smoothly and stably. Therefore, malfunction in the tape running operation may also be prevented, thereby improving quality and reliability of the magnetic recording and reproducing apparatus.

While the invention has been shown and described with reference to certain embodiments thereof, it will be understood by those skilled in the art that various changes in form and details may be made therein without departing from the spirit and scope of the invention as defined by the appended claims.

What is claimed is:

1. A cassette housing assembly for a magnetic recording and reproducing apparatus, comprising:
   a cassette housing adapted to receive a cassette tape;
   a locking lever connected to the cassette housing;
   an X-lever supporting vertical movement of the cassette housing with respect to a deck chassis of the magnetic recording and reproducing apparatus; and
   a locking member connected to the X-lever to engage the locking lever to retain the cassette housing in a down position.

2. The cassette housing assembly of claim 1, wherein the locking member is made of substantially the same material as the X-lever.

3. The cassette housing assembly of claim 2, wherein the material for the locking member is steel use stainless (SUS).

4. The cassette housing assembly of claim 2, wherein the locking member is integrally formed with the X-lever.

5. The cassette housing assembly of claim 4, wherein the locking member is a drawing boss formed by performing drawing with respect to the X-lever.

6. The cassette housing assembly of claim 4, wherein the locking member is a burring boss formed by performing burring with respect to the X-lever.

7. The cassette housing assembly of claim 1, wherein the X-lever has a first lever and a second lever connected by a pin.

8. The cassette housing assembly of claim 7, wherein the locking member is connected to the first lever of the X-lever.

9. The cassette housing assembly of claim 8, wherein a resilient member is connected between the locking lever and the first lever of the X-lever.

10. A cassette housing assembly for a magnetic recording and reproducing apparatus, comprising:
    a cassette housing adapted to receive a cassette tape;
    an X-lever supporting vertical movement of the cassette housing with respect to a deck chassis of the magnetic recording and reproducing apparatus; and
    a locking unit to retain the cassette housing in a down position, the locking unit including
      a locking lever disposed on the cassette housing and having a hook, and
      a locking member disposed on the X-lever and adapted to be engaged with the hook of the locking lever when the cassette housing is in the down position.

11. The cassette housing assembly of claim 10, wherein the locking member is made of substantially the same material as the X-lever.

12. The cassette housing assembly of claim 11, wherein the material for the locking member is steel use stainless (SUS).

13. The cassette housing assembly of claim 12, wherein the locking member is integrally formed with the X-lever.

14. The cassette housing assembly of claim 13, wherein the locking member is a drawing boss formed by performing drawing with respect to the X-lever.

15. The cassette housing assembly of claim 13, wherein the locking member is a burring boss formed by performing burring with respect to the X-lever.

16. The cassette housing assembly of claim 13, wherein a resilient member is connected between the X-lever and the locking lever.

17. A magnetic recording and reproducing apparatus, comprising:
    a deck chassis made of steel electrolytic commercial cold (SECC) and including a pair of reel tables for engagement with tape reels of a cassette tape, a plurality of rollers constituting a tape running system, and a head drum assembly;
    a cassette housing adapted to receive the cassette tape;
    an X-lever to connect the cassette housing to the deck chassis so that the cassette housing is vertically movable to receive or remove the cassette tape, the X-lever being made of steel use stainless (SUS); and
    a locking unit to fix the cassette housing in a down position to retain the cassette tape in the deck chassis, the locking unit including
      a locking lever disposed on the cassette housing and having a hook, the locking lever being made of SUS, and
      a locking member integrally formed on the X-lever and adapted to engage the hook of the locking lever.

18. The magnetic recording and reproducing apparatus of claim 17, wherein the locking member is a drawing boss formed by performing drawing with respect to the X-lever.

19. The magnetic recording and reproducing apparatus of claim 17, wherein the locking member is a burring boss formed by performing burring with respect to the X-lever.

20. The magnetic recording and reproducing apparatus of claim 17, wherein a resilient member is secured between the X-lever and the locking lever.

* * * * *